United States Patent
Lutz et al.

(10) Patent No.: US 6,414,787 B2
(45) Date of Patent: *Jul. 2, 2002

(54) OPTICAL FIBER AMPLIFIER HAVING A GAIN FLATTENING FILTER

(75) Inventors: Dirk Lutz, Solna; Peter Blixt, Hägersten, both of (SE)

(73) Assignee: Telefonaktiebolaget LM Ericsson, Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/282,185

(22) Filed: Mar. 31, 1999

(30) Foreign Application Priority Data

Apr. 1, 1998 (SE) ................................ 9801160

(51) Int. Cl.⁷ ............................ H01S 3/06; G02B 6/26; H04B 10/17
(52) U.S. Cl. ............................ 359/337.21; 359/337.1; 359/341.1
(58) Field of Search .................. 359/130, 161, 359/337, 341, 346, 337.1, 337.2, 337.21, 341.1; 385/10, 28, 37

(56) References Cited

U.S. PATENT DOCUMENTS

| 5,115,338 A | 5/1992 | DiGiovanni et al. |
| 5,245,467 A | 9/1993 | Grasso et al. |
| 5,260,823 A | 11/1993 | Payne et al. |
| 5,375,010 A | 12/1994 | Zervas et al. |
| 5,430,817 A | 7/1995 | Vengsarkar |
| 5,872,650 A | * 2/1999 | Lee et al. .................. 359/341 |

FOREIGN PATENT DOCUMENTS

| WO | 91/18434 | * 11/1991 |
| WO | 93/67664 | * 4/1993 |

OTHER PUBLICATIONS

Oda et al, OFC '95 tech. Digest, Doc. TuH1, Aug. 8, 1995.*
Erdogan et al, Laser Focus World, pp. 73, 74,76,78,80, Feb. 1994.*
Giles et al, Jour. of Lightwave Tech., vol. 9, #2, pp. 275–283, Feb. 1991.*
Lebref et al J. of Lightwave Technology, vol. 15, No. 5, May 1997 pp 766–770 "Theoretical Study of the Gain Equalization of a Stabilized Gain EDFA for WDM Applications".

* cited by examiner

*Primary Examiner*—Nelson Moskowitz
(74) *Attorney, Agent, or Firm*—Nixon & Vanderhye P.C.

(57) ABSTRACT

An optical fiber amplifier of the erbium type is intended to amplify light signals within a wavelength band, e.g. in the range of 1540–1555 mm. The active optical fiber receives light signals to be amplified and pump light of a first pump wavelength from a pump source. A gain flattening filter is connected in the active optical fiber length. A noise filter is also connected in the active optical fiber, not more closer to the output end of the active fiber the gain flattening filter. The noise filter blocks light waves having wavelengths around the ASE gain peak and the gain filter attenuates wavelengths within the useful signal band in order to produce a flat gain curve. The introduction of the noise filter increases the total amplification of the amplifier.

14 Claims, 10 Drawing Sheets

OPTICAL FIBER AMPLIFIER HAVING A GAIN FLATTENING FILTER

The present invention relates to an optical amplifier based on erbium-doped fibers and having a gain flattening filter and also to a fiber optical network including such an optical amplifier.

BACKGROUND

Optical fibers are presently widely used for communicating information such as in large telecommunication systems, primarily owing to their large reliability, their insensitivity to electrical interference and their high capacity. Of course, there is a desire in the existing telecommunication networks to use the available optical fibers in their networks as efficiently as possible, in particular for communication over long distances, since such fibers obviously have high installation costs. By introducing wavelength division multiplexing WDM in existing communication systems using optical fibers and in new communication systems to be built a plurality of individual wavelength channels can be transmitted on the same optical fiber and thus the information transmitted over the fiber can be multiplied.

In optical fiber networks for long distance communication there may be a need for amplifying the optical signals. Such amplification can of course be achieved by a repeater built in a straight-forward way, including components converting the optical signals to electrical signals, amplifying the electrical signals and converting the electrical signals to optical signals. For WDM signals this will require one optoelectrical and one electrooptical converter per wavelength channel used in the WDM transmission and also one filter or demultiplexer for filtering out the different wavelengths in the incoming signal. This will obviously be very costly and also results in reliability problems owing the large number of components, both electronic and optical, which are required.

Another type of amplifier comprises optical fiber amplifiers based on optical fibers doped with rare-earth metals, primarily erbium-doped fiber amplifiers. Such amplifiers have great advantages when used in optical fiber systems owing to e.g. their compatibility with the optical fibers and their high gain, and they are in particular advantageous when used in wavelength multiplexed transmission systems, since they are capable of simultaneously amplifying a number of WDM channels and only require a limited amount of electronic components. The basic design of an erbium-doped fiber amplifier includes one length of an active, erbium-doped optical fiber, connected at its input end to the output of a 2-to-1 optical coupler, the coupler receiving on one of its inputs the signal to be amplified and on the other input more energetic light providing the power for amplifying the signal. This more energetic input light is called the pump light and is obtained from an optical power source, called the optical pump. The pump light has a shorter wavelength tan that of the signal and is generally more energetic and is capable of lifting erbium ions from lower energy states to higher energy states in the erbium-doped fiber. Light is then generated in the fiber when the ions return to lower energy levels.

However, in erbium-doped amplifiers a problem related to spontaneous emission may exist. Spontaneous emission results from the interaction of the pump light with the erbium metal ions in the fiber and appears as noise added to the signal to be amplified. Furthermore, the light caused by spontaneous emission is amplified during the propagation of light in the fiber, in both directions, resulting in so called amplified spontaneous emission ASE. The ASE is very nearly proportional to the amplifier gain and therefore the ASE spectrum is very similar to the gain spectrum, having a preponderance of power at the gain peak.

In U.S. Pat. No. 5,375,010 an optical amplifier is disclosed comprising two lengths of erbium-doped fiber connected in series via an isolator. The isolator reduces the transmission of backward-travelling amplified spontaneous emission ASE from the second length to the first length when optical pump power is supplied to the first length.

U.S. Pat. No. 5,260,823 discloses an erbium-doped fiber amplifier having a gain-shaping filter between two lengths of erbium-doped fiber. The filter is a band-rejection filter operating at the peak wavelength of the gain spectrum. The attenuation of the band-rejection filter is chosen so that it exactly cancels the larger gain at the peak wavelength and thus modifies the overall gain spectrum to a more uniform shape. Typical filter values comprise an 8 dB attenuation at 1531 nm, for a 3 dB-bandwidth of 4 nm. A filter used is based on wavelength-selective resonant coupling from the propagating core mode of the fiber to a cladding leaky mode. A single optical filter used was obtained by periodically perturbing the fiber and it consisted of a grating having a period of 775 $\mu$m, the fiber being sandwiched between the grating and a flat plate. Also a dielectric interference filter can be used.

Long-period grating filters have been proposed for gain-flattening erbium-doped amplifiers. In U.S. Pat. No. 5,430,817 long period grating filters are placed at each end of a length of amplifying fiber pumped in opposite directions at two different wavelengths, the filters removing unused pump energy which has passed through the length of amplifying fiber. In the article Paul F. Wysocki et al., "Broad-band Erbium-Doped Fiber Amplifier Flattened Beyond 40 nm Using Long-Priod Grating Filter", IEEE Photonics Techn. Lett., Vol. 9, 10, October 1997, a long period grating filter is applied between two lengths of erbium-doped fiber, the lengths being individually pumped at different wavelengths. In R. Lebref et al., "Theoretical Study of the Gain Equalization of a Stabilized Gain EDFA for WDM applications", J. Lightw. Techn., Vol. 15, No. 5, May 1997, gain-flattening is theoretically studied for a case having a first band-rejection filter inserted between two lengths of erbium-doped fiber and a second band-rejection filter connected to the output end of the doped fiber, the first filter being more dissipative than the second one. The filters can be long period fiber gratings having approximately Gaussian characteristics. The first filter had a maximum attenuation of 5.2 dB at 1531 nm for a bandwidth of 7 nm and the second filter had a maximum attenuation of 3 dB at 1533.4 nm for a bandwidth of 5 nm. The first filter should be inserted after the first quarter of the total doped optical fiber in order to get the lowest noise figure or after the first tenth in order to get best stabilized gain, the latter case however resulting in a bad noise figure. Fabrication of long period fiber gratings is e.g. described in A. Vengsarkar, "Long-period fiber gratings", in Conf. Optical Fiber Communications, 1996 Tech. Dig. Ser. Washington DC: Opt. Soc. Amer. 1996, Vol. 2, pp. 269–270, paper ThP4.

SUMMARY

It is an object of the invention to provide an optical fiber amplifier having a low noise figure and a high gain.

The problem solved by the invention is thus how to design an optical fiber amplifier having its gain flattened in the conventional way, maintaining a high gain and a low noise figure.

An optical fiber amplifier using as an active medium a length of optical fiber doped is with some rare-earth metal such as erbium is designed to amplify light signals within some useful wavelength band, for instance in a range of 1540–1555 nm. The active optical fiber receives in the conventional way light signals to be amplfied and pump light of a first pump wavelength from a pump source. A gain flattening filter is connected in the active optical fiber length in order to give the amplifier a gain which is substantially constant for all wavelengths within the useful wavelength band. A noise filter is also connected in the active optical fiber in a position, which is not located more closer to the output end of the active fiber than the gain flattening filter. The active fiber length can then be divided in three portions which are serially connected and in the joints of which the filters are connected. The noise filter effectively blocks light waves having wavelengths around the gain peak of the spontaneous emission and the gain filter attenuates wavelengths within the useful signal band in order to produce a flat gain curve. The introduction of the noise filter increases the total amplification of the amplifier, maintaining a low noise figure.

Additional objects and advantages of the invention will be set forth in the description which follows, and in pan will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

Figure 13:
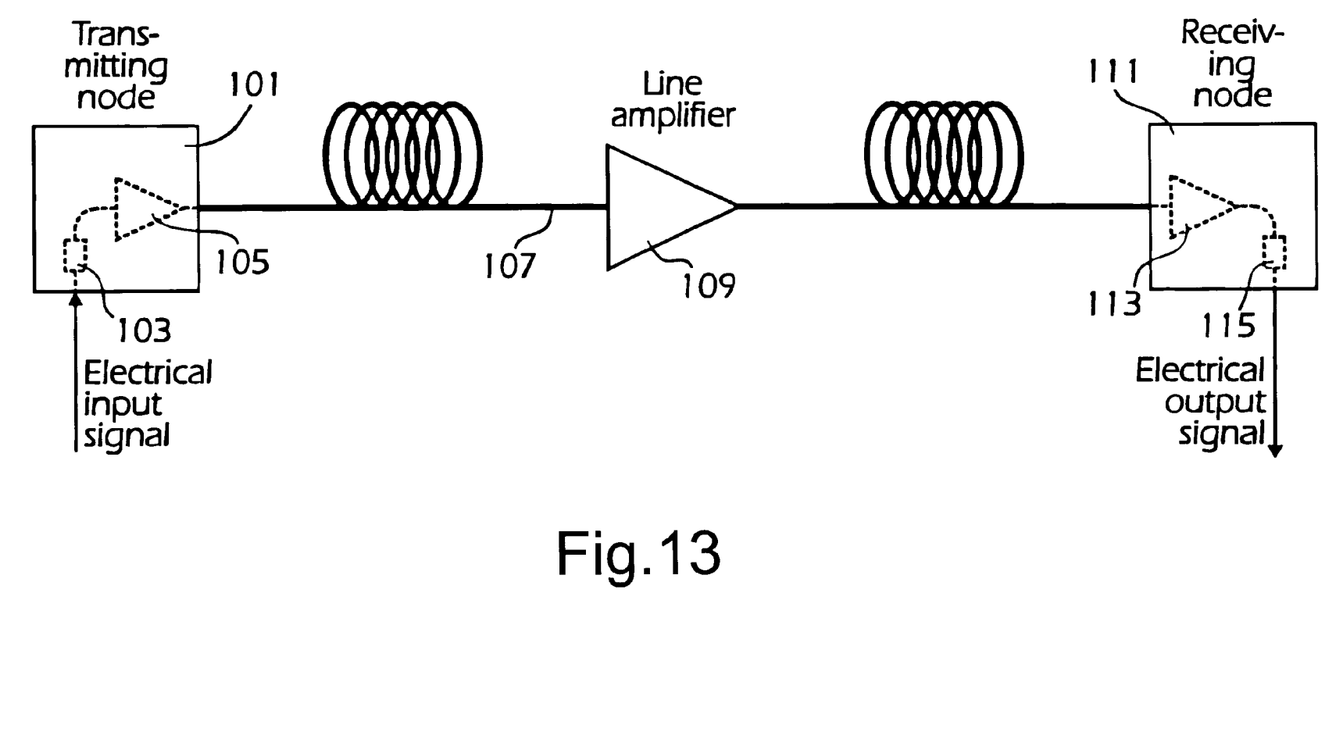
FIG. 13 is a schematic picture showing a simple fiber optical network using optical fiber amplifiers.

Optical fiber amplifiers are presently used at various positions inside fiber optical networks as illustrated in FIG. 13. Here a transmitting node 101 receives an electrical signal which is converted to a light signal by the laser 103. The light signal is amplified by a booster amplifier 105 and therefrom transmitted on a long optical fiber 107. The signal can be attenuated when propagating along the optical fiber 107 and then it has to amplified by a line amplifier 109. The light signal on the optical fiber 107 is received by a receiving node 111, in which it is first amplified by a preamplifier 113. The amplified signal is detected by a light detector 115 and therein converted to an electric signal, which is provided from the node. In such a network, the booster 105, the line amplifier 109 and the preamplifier 113 usually all comprise optical fiber amplifiers using a length of an active optical fiber as the amplifying medium or element.

Figure 1:
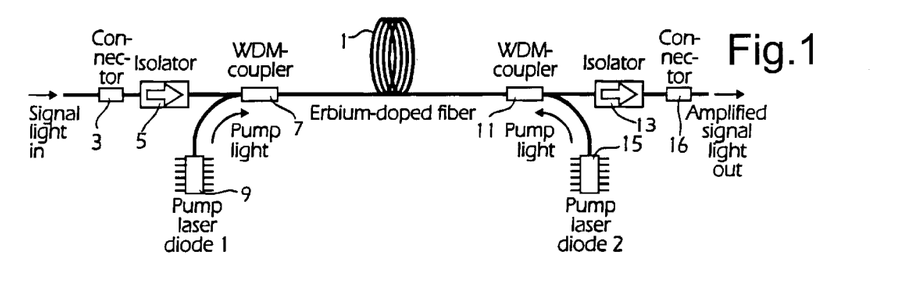
FIG. 1 is a schematic picture showing the general configuration of an optical fiber amplifier.

In FIG. 1 the general configuration of an optical fiber amplifier is illustrated, which is adapted to amplify incoming light signals, the light signals usually being of the electromagnetic single mode type. The active part of the optical fiber amplifier is a piece or length 1 of erbium-doped fiber. The erbium-doped fiber length 1 receives an optical signal comprising only optical single modes from some source, not shown, arriving to a connector 3, passing on an ordinary optical fiber from the connector 3 to an optical isolator 5 and from the optical isolator to an input of a power combiner or coupler 7, the power combiner 7 receiving on its other input the pumping light power from a pump source 9, which generates light of e.g. the wavelength 980 nm or 1480 nm. The pump source is conventionally a laser diode of a suitable kind. The output of the power combiner 7 is connected to the input end of the erbium doped fiber 1.

The output end of the erbium doped fiber 1 is connected to the input of an optical power splitter/combiner or coupler. 11. One output of the power splitter/combiner 11 is connected to an optical isolator 13, the output terminal of which is connected to a connector 16. Light from the active fiber length 1 will thus propagate through the connector 16 to some destination, not shown. The power/splitter combiner 11 also receives, on an input terminal parallel to its output terminal, pumping light from a second pump source 15, e.g. like the first pump source 9 generating light of the wavelength 980 nm or 1480 nm. The optical amplifier construction having two pump sources acting in opposite injection directions is disclosed in U.S. Pat. Nos. 5,140,456 and 5,218,608.

The optical amplifier as illustrated in FIG. 1 is said to be pump co-directional or be pumped co-directionally if the pump light propagates only in the same direction as the signal light, which is to be amplified. In this case only the first pump source 9 is active. The power splitter/combiner 11 on the output side and the second pump source 17 can then be omitted. The optical amplifier is said to be pump contra-directional or be pumped contra-directionally if the pump light propagates only in the direction opposite to the propagation direction of the signal light. In that case only the second pump source 15 is active and the power combiner 7 and the pump source 9 on the input side can be omitted. The optical amplifier is said to be pump bi-directional or be pumped bi-directionally if there is pump light propagating in both directions, i.e. both in the same direction as the signal light and in the opposite direction. In this last case both pump sources 9, 15 are active.

In the case where the optical amplifier is pumped at the shorter wavelength of 980 nm, all of the optical amplifier acts as a three level lasering system and the maximum population inversion is equal to 1 and thus the quantum limit of the noise figure is 3 dB. In the case where the optical amplifier is pumped at the longer wavelength of 1480 nm, all of the optical amplifier acts as a two level lasering system. The maximum population inversion depends of the ratio of absorption and emission cross-sections at this pumping wavelength. The maximum population inversion is lower than 1 and thus the quantum limit of the noise figure is higher than 3 dB. Usually the noise figure value is about 4 dB.

Figure 2:
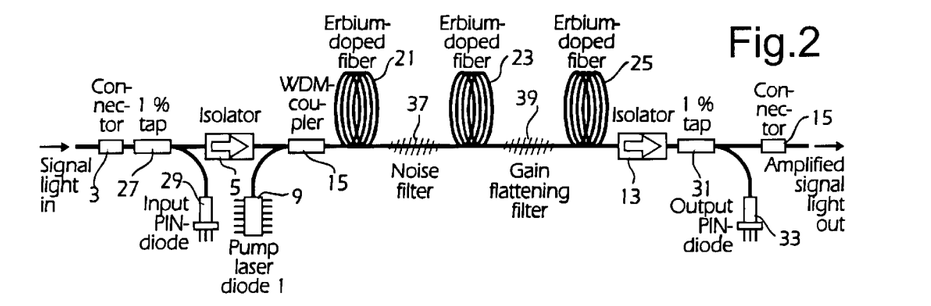
FIG. 2 is a schematic picture showing the configuration of an optical fiber amplifier having additional filtering.

In the modified optical amplifier shown in the block diagram of FIG. 2, the active, to doped fiber length 1 has been divided into three segments 21, 23, 25, which are thus connected in series with each other. The input end of the first segment 21 is connected to the output of the power combiner 7 on the amplifier input side. The signal light passes here from the connector 3 on the input side to a power splitting device or coupler 27, tapping off a small part, e.g. 1%, of the light power on the fiber to a power measurement device such as PIN diode 29. The output signal of the PIN diode 29 indicates the power of the incoming light signal and can be used for controlling the amplifier. The substantial part of the light power continues to the optical isolator 5. Also on the output side there may be a monitoring tap, so that the output of the optical isolator 13 on this side is connected to a power spitter or coupler 31, like the power splitter 27 on the input side tapping off a small portion, e.g. 1%, of the power of light on the fiber to a power measurement device such as a PIN diode 33. The amplifier depicted in FIG. 2 is only co-directionally pumped and thus there is only a laser diode 9 pumping light into the active fiber segments in a direction coinciding with that of the signal light.

Between the first and second active fiber lengths 21, 23 is a first filter, a noise filter 37 or LNF connected which is thus connected closer to the input end of the total active fiber length than to the output end. The first fiber length 21 can have a length corresponding to about 0.1–0.4 of the total active fiber length. Between the second and third fiber lengths 23, 25 is a gain flattening filter 39 or FF connected, which is thus connected closer to the output end of the total active fiber length than the noise filter 37.

Figure 3:
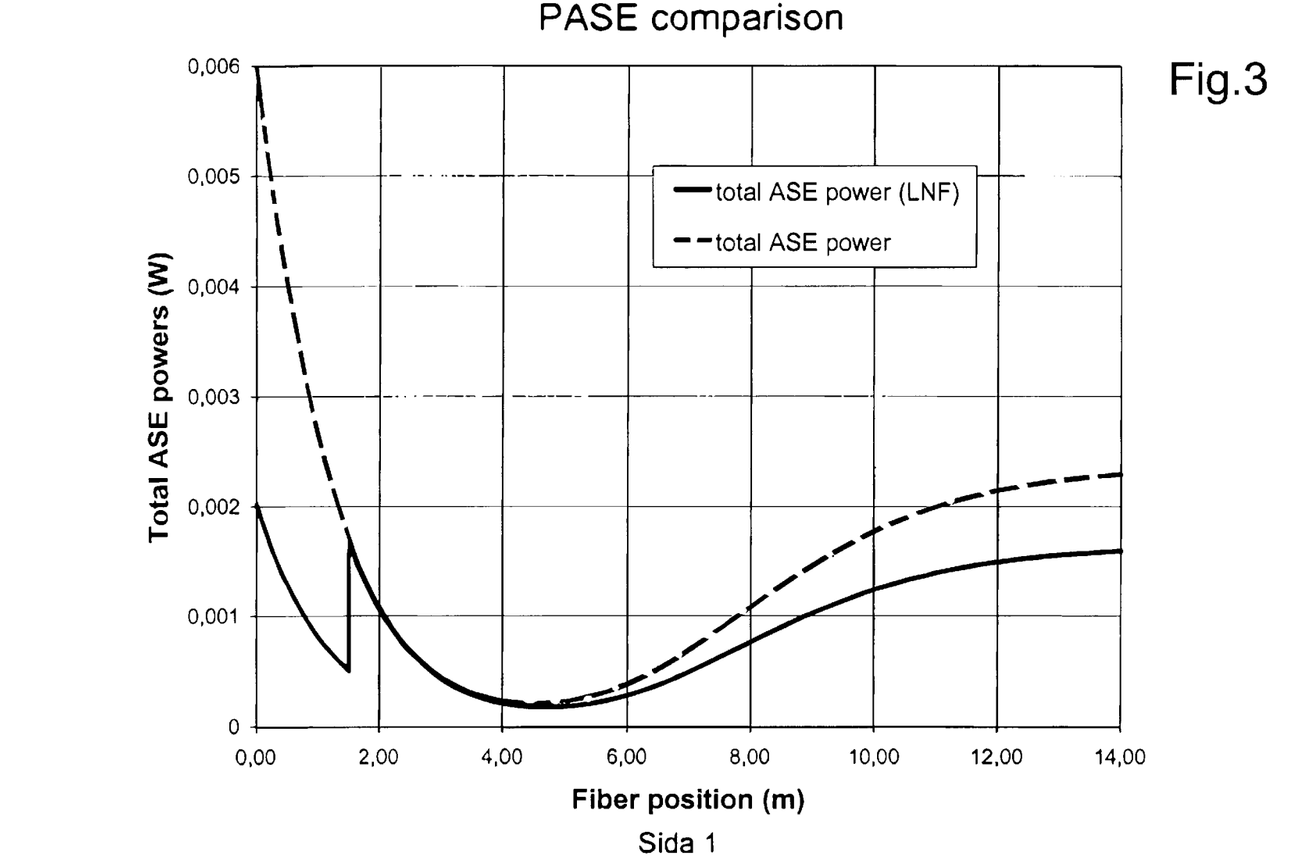
FIG. 3 is a diagram of total ASE power of an optical fiber amplifier without and with a noise filter as a function of the position along an active optical fiber.
Figure 9:
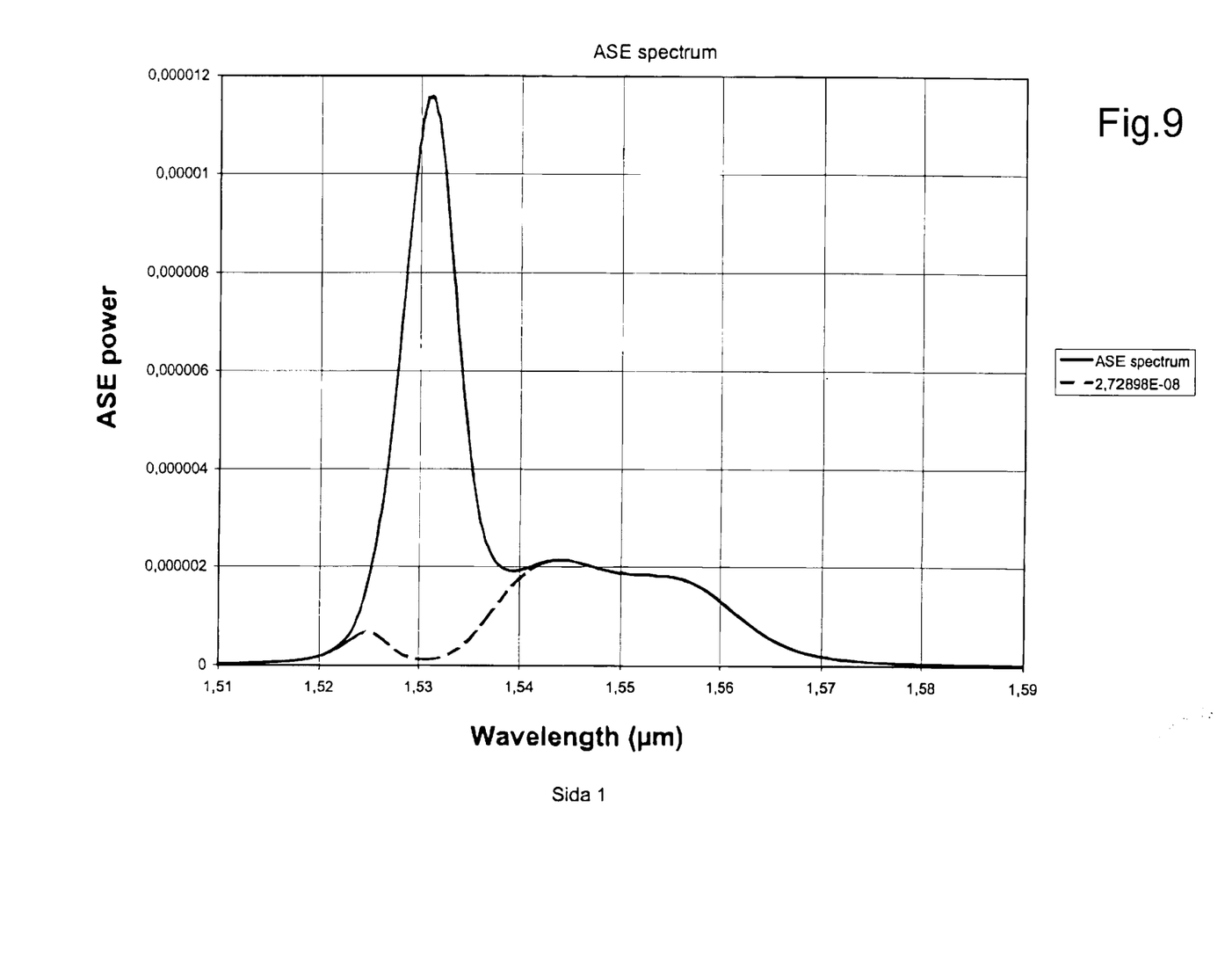
FIG. 9 is a diagram of the ASE spectrum showing the ASE power as a function of the wavelength.

In each small considered portion of the total active fiber length spontaneous emission occurs resulting from the pumping light. The spontaneous emission results in light propagating in both directions from the considered portion, the light being amplifed in the part of the total active fiber length through which it propagates, this amplified light being called amplified spontaneous emission as discussed in the introduction. The noise filter 37 is a notch filter or band-blocking filter blocking and strongly attenuates wavelengths at the wavelength for peak gain in an identical amplifier operating without any filters, i.e. blocking wavelengths in a region about the wavelength of 1531 nm, see the diagram of FIG. 9 showing the ASE spectrum and the filter characteristic shown in FIG. 10. It can be made as a long period grating filter having a maximum attenuation of at least 15 dB. The noise filter 31 is transparent to the other wavelengths inside the signal band. It should not affect the modes of the light propagating in the active fiber lengths and in particular it must be single-mode type for all wavelengths in the signal band and for the wavelengths of the pump light. In the diagram of FIG. 3 the total ASE power is plotted as a function of the position along the total active fiber length for a total length of 14 m, the solid curve showing the total ASE power for no filters used and the dashed curve showing the total ASE power for the case where a noise filter 37 is positioned at a distance of 0.1 from the input end of the total active fiber length and no gain flattening filter 39 is used.

Figure 4:
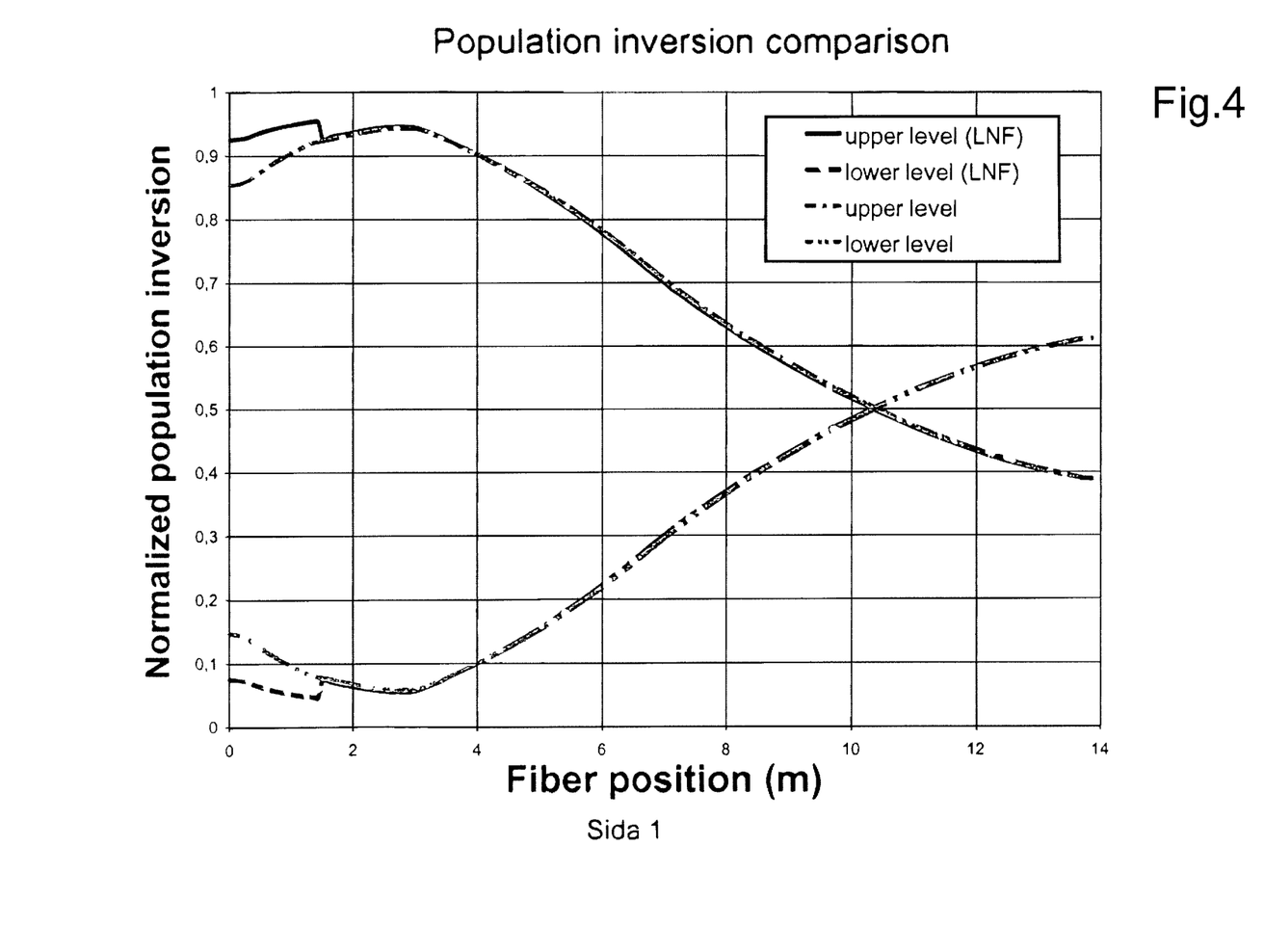
FIG. 4 is a diagram of normalized population inversion as a function of the position along an active optical fiber in an optical fiber amplifier without and with a noise filter.
Figure 5:
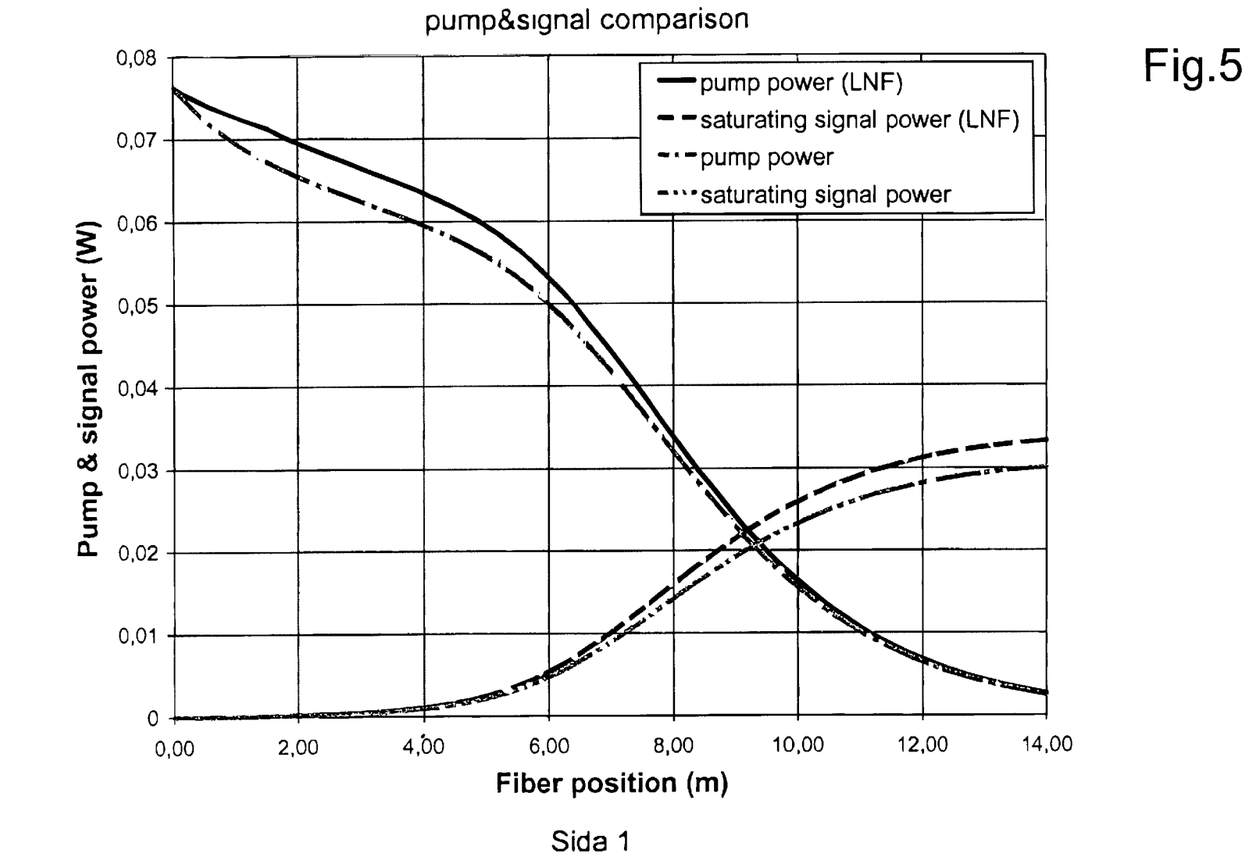
FIG. 5 is a diagram of the pump power and saturating signal power as a function of the position along an active optical fiber in an optical fiber amplifier without and with a noise filter.

In particular, the reduction of the backward travelling total ASE power caused by the noise filter 37 will result in an increased population inversion at the input end of the total active fiber length. This is visible in the diagram of FIG. 4 showing the normalized population inversion as a function of the position along the total active fiber length. The smooth curves illustrate the population inversion without any filters and the curves is having a step at 1.4 m (=0.1·14 m) illustrate the population inversion for only a noise filter 37 positioned as described above. The higher population inversion at the input end results in a lower noise figure of the output light signal and a higher gain of the amplifier. There is also a reduction of the forward travelling total ASE power, which then also results in a higher population inversion and a higher gain. This can be seen in the diagram of FIG. 5 illustrating the pump power and the saturating signal power as a function of the position along the total active fiber length, both for a total fiber length having no filters at all and for a fiber length having a noise filter 37 connected as above.

Figure 6:
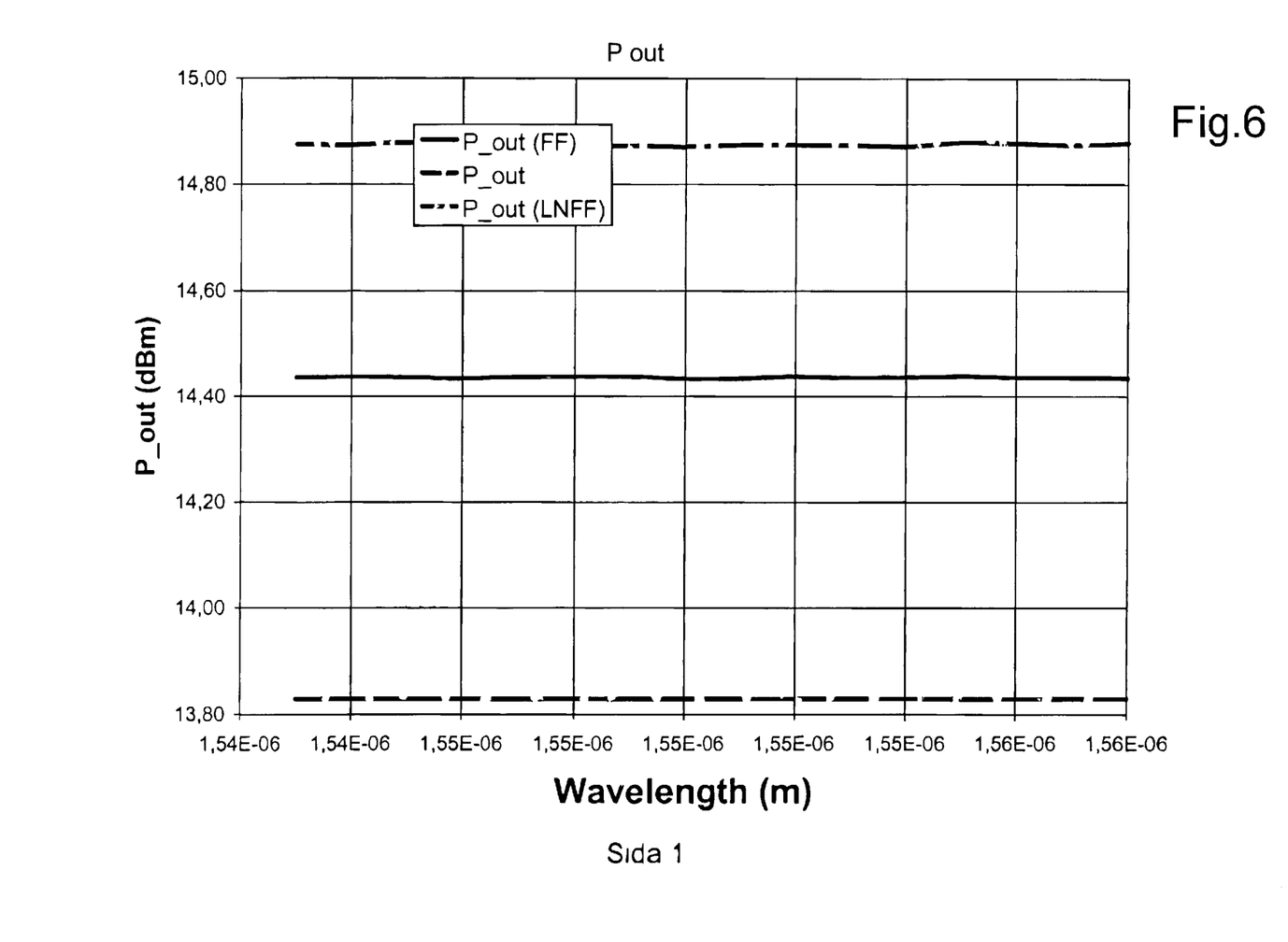
FIG. 6 is a diagram of output signal power as a function of the wavelength in an optical fiber amplifier having only a gain flattening filter connected after the active fiber length, having only a gain flattening filter between two portions of the active fiber length and having both a gain flattening filter and a noise filter respectively.
Figure 7:
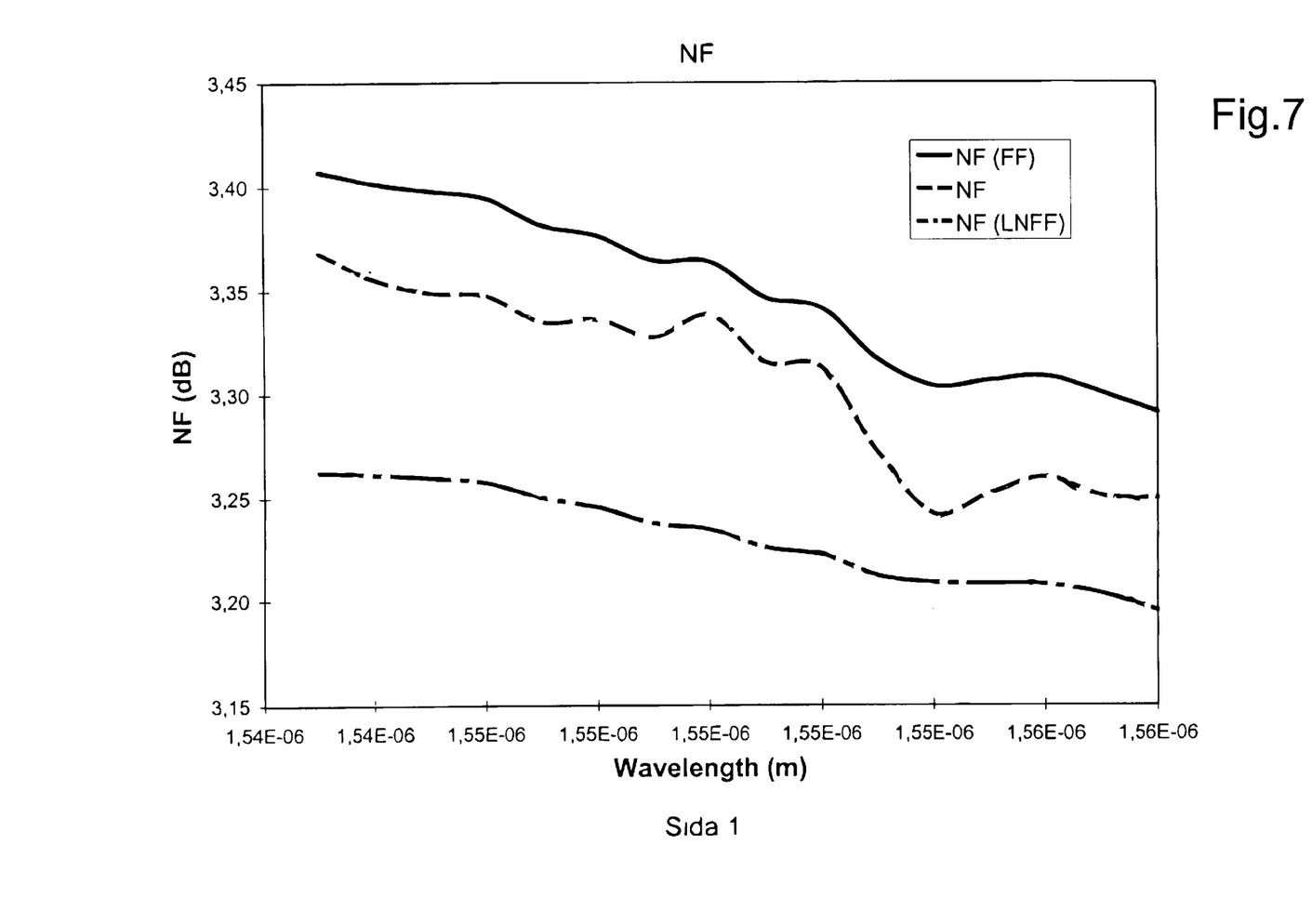
FIG. 7 is a diagram of the noise figure as a function of the wavelength in an optical fiber amplifier without, with only a gain flattening filter and with both a gain flattening filter and a noise filter.
Figure 8:
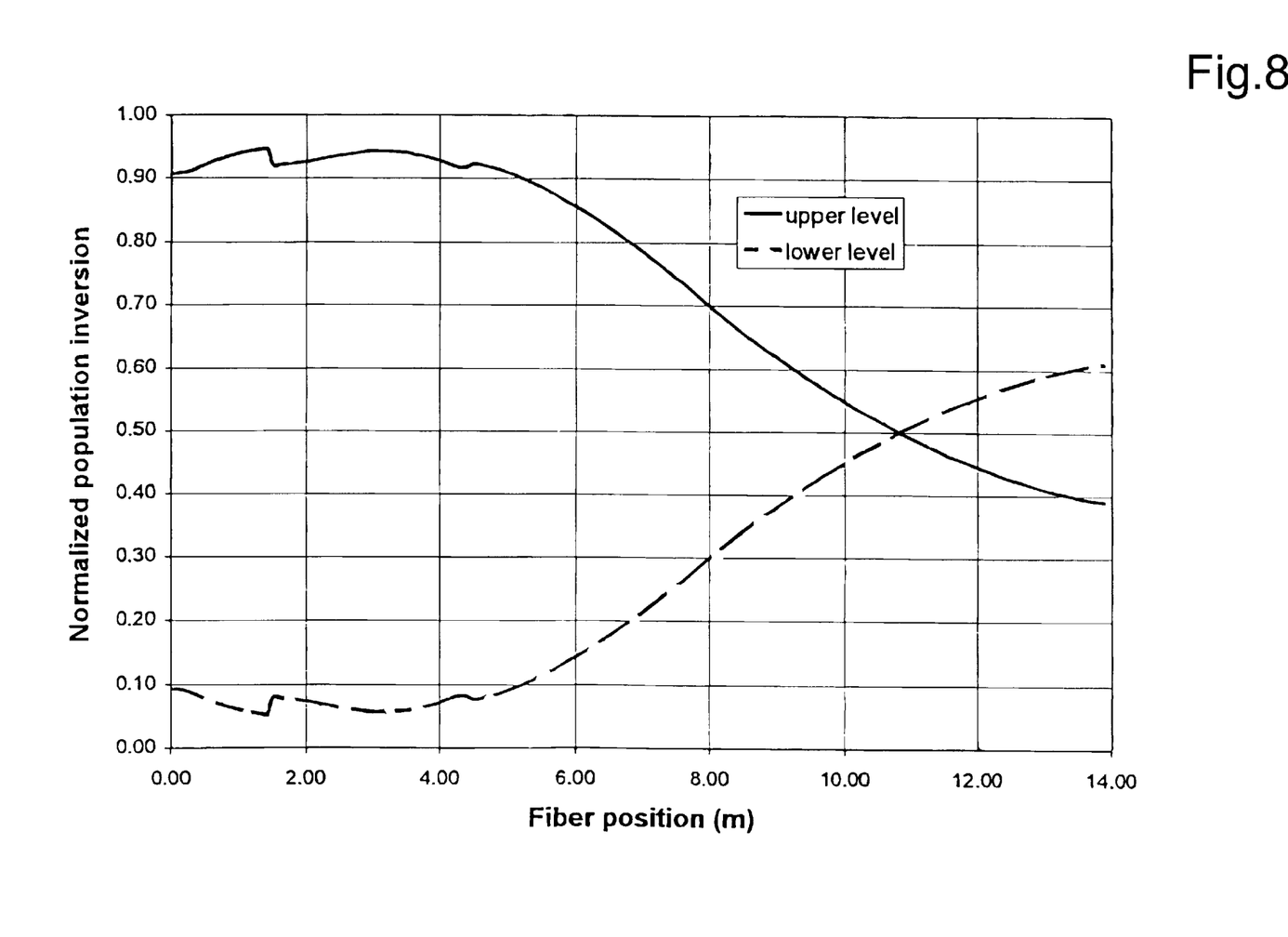
FIG. 8 is a diagram of normalized population inversion as a function of the position in the active fiber length in an optical fiber amplifier having both a gain flattening filter and a noise filter.

The gain flatness filter 39 is used to obtain a flat gain profile as required in a WDM system and can also be made as a long period grating filter. If the flatness filter 39 is connected too close to the input end of the total active fiber length, the noise figure of the output signal is degraded. The gain flatness filter should have a position located at a distance of about 0.3–0.4 of the total active fiber length from the input end of the total active fiber length. For a suitable position the gain will be increased. This is illustrated in FIG. 6 showing the output saturating signal power as a function of the wavelength for the three different cases comprising only a gain flattening filter connected at the end of the active fiber, i.e. at the end of the third fiber piece 25, only a gain flattening filter connected between two pieces of active optical fiber, i.e. only the filter 39 according to FIG. 2, and both a gain flattening filter 39 and a noise filter 37, as depicted in FIG. 2. The lowest curve of FIG. 6 shows the saturating signal power for a single length of optical amplifier fiber having only a gain flattening filters connected at the end of the active fiber. The lowest theoretical possible flat or constant curve would be for an output power of a little more than 13.8 dBm. By using only a suitably designed gain flattening filter 39 connected in the active fiber a flat curve for a constant value of somewhat more than 14.4 dBm can be obtained, see the middle horizontal curve in FIG. 6. Such a gain flattening filter 39 will have different characteristics for different positions thereof along the total active fiber length, i.e. it must be designed considering its position along the active fiber length. By using both a gain flattening filter 39 and a noise filter 37 the saturating signal power can be increased even more, as shown by the upper horizontal curve of FIG. 6. Graphs of the corresponding noise figure and normalized population inversion as functions of the wavelength are shown in FIGS. 7 and 8.

The gain flattening filter 39 can be designed as suggested in the prior art, see e.g. the cited article by Paul F. Wysocki et al. It is adapted to selectively attenuate light having wavelengths within the wavelength band used for signal transmission. It is specially designed to provide a gain characteristic of the entire amplifier being as constant as possible for light within the, wavelength band used for signal transmission.

Figure 10:
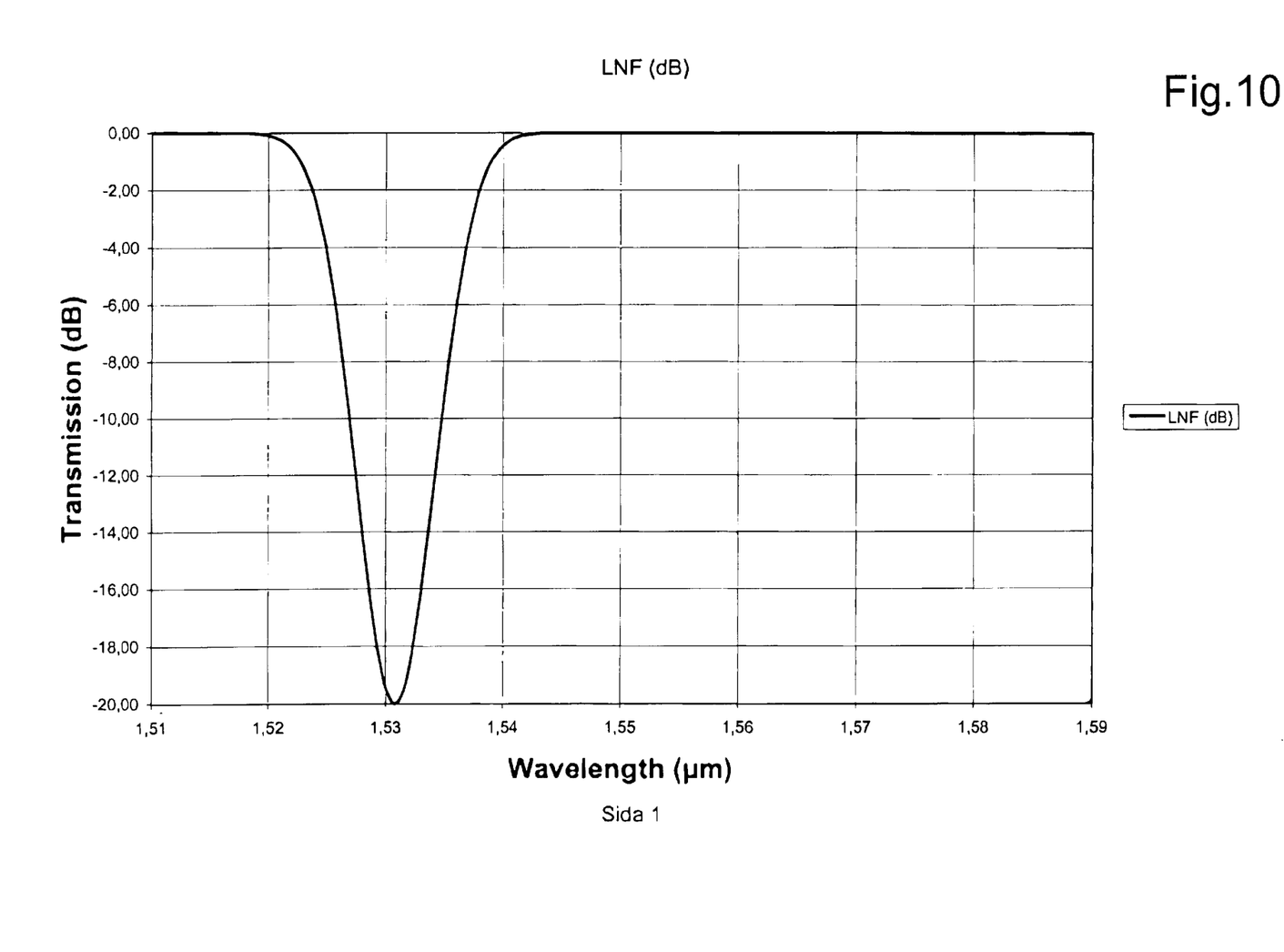
FIG. 10 is a diagram of the characteristic of a noise filter showing the transmission of the filter as a function of the wavelength.

As seen in FIG. 10, the noise filter 37 can have a narrow filtering range with a 3 dB bandwidth of e.g. about 10 to 12 nm and with a peak attenuation of about −15 to −20 dB. The gain flattening filter 39 has a much lower attenuation for the wavelengths of the signal band. The gain flattening filter can e.g. have more than one attenuating wave-length band which partly overlap each other as suggested in the prior art. In designing the filters first the noise filter characteristic is selected. Then, using known data and algorithms as proposed in the references cited above, the wanted characteristic of the gain filter is calculated and the design thereof is determined which gives a real characteristic which as well as possible agrees with the desired one, which usually is a constant gain for the wavelengths of the signal band.

Figure 11:
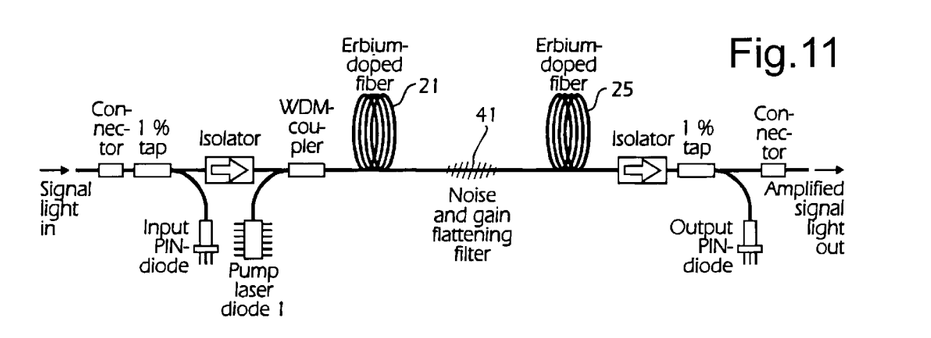
FIG. 11 is a schematic picture showing the general configuration of another embodiment of an optical fiber amplifier.

The noise filter 27 and the gain flattening filter 29 can be combined in a single filter 41 having suitable characteristics, as illustrated by the optical amplifier shown in the block diagram of FIG. 11. The middle length 23 of active optical fiber is then omitted and the single combined filter 41 then connects the output end of the first fiber 21 to the input end of the third fiber length 25.

The simultaneous use of a noise filter and a gain flattening filter is also possible for an optical fiber amplifier having light pumped in opposite directions, from both ends of the active fiber length, as shown in the diagram of a general optical amplifier in FIG. 1. A bi-directionally pumped optical amplifier having a combined noise and gain flattening filter 41 connected between the two fiber lengths 21, 25 is illustrated by the block diagram in FIG. 12. The amplifier of FIG. 12 differs from that illustrated in FIG. 11 by having a power splitter/combiner 11 connected to the output end of the total active fiber length. The splitter/combiner 11 receives pumping light from the pump source 15, the pumping light generally having a longer wavelength than that of the pumping light generated by the pump source 9 at the input side of the total active fiber length. In a common case the pump source at the output side emits a wavelength of 1480 nm to be compared to the wavelength of 980 mn of light generated by the input side pump generator 9.

The filters used in the amplifier as described herein can be designed, as has been indicated above, as long period grating filters. In the case where the active fiber is bi-directionally pumped, the filters are designed to also have strong attenuations at the pump wavelengths most close to the wavelength band of interest, i.e. at about 1480 nm in the common case, in order to simultaneously reduce the noise figure and increase the gain.

Figure 12:
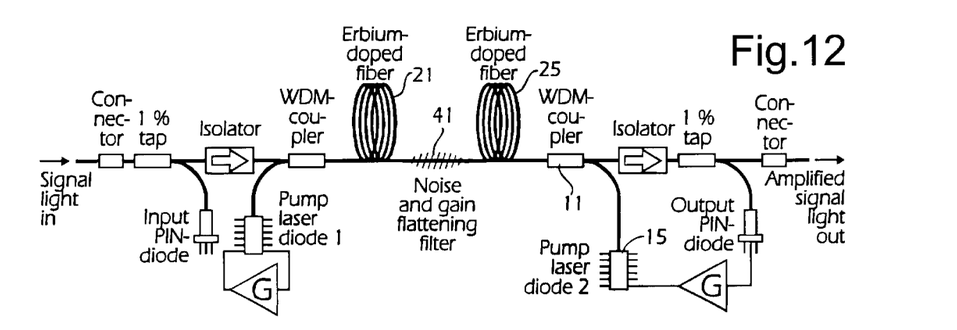
FIG. 12 is a schematic picture showing the general configuration of still another embodiment of an optical fiber amplifier having two pump sources.

The level of the power output from the pump light sources 9, 15 can be controlled interplay in the sources and/or by a signal derived from the output PIN diode 33, as illustrated in FIG. 12.

As has been indicated above, the amplifiers as described herein are intended for primarily amplifying light signals of the electromagnetic single mode type. This implies that all components used should not affect the electromagnetic modes of the light, both of the signal light and of the pump light. The components, in particular the optical power combiners and the filters, should then also be designed for transmitting light of the respective wavelengths of signal light and of pump light in single mode.

Thus, an optical fiber amplifier to be used for example in WDM-networks has been described herein providing a low noise figure and a high gain by using two filters or a filter having the combined characteristics of two filters.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. An optical fiber amplifier for amplifying light signals having wavelengths within a wavelength band, the optical fiber amplifier comprising:

an active optical fiber having an input end to receive light signals to be amplified and an output end for forwarding amplified light signals;

a first pump source connected to inject pumping light of a first pump wavelength into the active optical fiber;

a gain flattening filter connected between first and second lengths of the active optical fiber, the gain flattening filter being connected to the fiber between the first length at the input end of the active optical fiber and the second length at the output end of the active optical fiber;

a noise filter connected in the first length, between two portions of the first length, the noise filter substantially blocking light waves having wavelengths at a gain peak of the pumped active optical fiber existing when there are no filters in the optical fiber amplifier, wherein the gain flattening filter and the noise filter are different type filters in that the gain flattening filter has much lower attenuation than the noise filter; and wherein the noise filter is a notch filter and is adapted to substantially block light having wavelengths around the gain peak with substantially 15–20 dB.

2. The optical fiber amplifier of claim 1, wherein the noise filter is adapted to substantially block light having wavelengths around a gain peak of substantially 1531 nm.

3. The optical fiber amplifier of claim 1, wherein the noise filter has a bandwidth of substantially 10–12 mm.

4. The optical fiber amplifier of claim 1, wherein the noise filter is adapted to substantially block light waves having wavelengths between the wavelengths 1521 nm and 1541 nm.

5. The optical fiber amplifier of claim 1, wherein the noise filter is connected at the same place as the gain flattening filter.

6. The optical fiber amplifier of claim 1 further comprising a second pump source connected to inject pumping light of a second pump wavelength into the active optical fiber, the noise filter and/or the gain flattening filter being adapted to strongly reject light of the second pump wavelength.

7. The optical fiber amplifier of claim 6, wherein the noise filter and/or the gain flattening filter are adapted to strongly attenuate light of a wavelength which corresponds to the longer one of the first and second pump wavelengths.

8. A fiber optical network including at least a transmitting node and a receiving node and at least one optical fiber amplifier for amplifying light signals having wavelengths within a wavelength band, the at least one optical fiber amplifier comprising:

an active optical fiber having an input end adapted to receive light signals to be amplified and an output end adapted to forward amplified light signals;

a first pump source connected to inject pumping light of a first pump wavelength into the active optical fiber;

a gain flattening filter connected between two lengths of the active optical fiber, between a first length at the input end of the active optical fiber and a second length at the output end of the active optical fiber;

a noise filter connected in the first length, between two portions of the first length, the noise filter substantially blocking light waves having wavelengths at a gain peak of the pumped optical fiber existing when there are no filters in the at least one optical fiber amplifier; and wherein the gain flattening filter has much lower attenuation than the noise filter; and wherein the noise filter is a notch filter having a peak attenuation of about −15 to −20 dB.

9. The fiber optical network of claim 8, wherein the noise filter in the at least one optical fiber amplifier is adapted to substantially block light having wavelengths around a gain peak of substantially 1531 nm.

10. The fiber optical network of claim 8, wherein the noise filter in the at least one optical fiber amplifier has a bandwidth of substantially 10–12 nm.

11. The fiber optical network of claim 8, wherein the noise filter in the at least one optical fiber amplifier is adapted to substantially block light waves having wavelengths between the wavelengths 1521 nm and 1541 nm 12. The fiber optical network of claim 8, wherein the noise filter in the at least one optical fiber amplifier is connected at the same place as the gain flattening filter.

13. The fiber optical network of claim 8, wherein the at least one optical fiber amplifier further comprises a second pump source connected to inject pumping light of a second pump wavelength into the active optical fiber of the at least one optical fiber amplifier, the noise filter and/or the gain flattening filter of the at least one optical fiber amplifier being adapted to strongly reject light of the second pump wavelength.

14. The fiber optical network of claim 13, wherein the noise filter and/or the gain flattening fiter in the at least one optical fiber amplifier are adapted to strongly attenuate light of a wavelength which corresponds to the longer one of the first and second pump wavelengths.

* * * * *